Dec. 19, 1967  G. E. SIMS  3,358,948
AIRCRAFT TRACK HOLDING SYSTEMS
Filed Oct. 19, 1964  2 Sheets-Sheet 1

INVENTOR
GEORGE E. SIMS
BY
ATTORNEYS

United States Patent Office 3,358,948
Patented Dec. 19, 1967

3,358,948
AIRCRAFT TRACK HOLDING SYSTEMS
George Edward Sims, London, England, assignor to Elliott Brothers (London) Limited, London, England, a British company
Filed Oct. 19, 1964, Ser. No. 404,605
Claims priority, application Great Britain,
Oct. 21, 1963, 41,441/63
17 Claims. (Cl. 244—77)

ABSTRACT OF THE DISCLOSURE

A damping signal in an aircraft track holding system is introduced by circuitry operating on the bank angle output of the vertical gyro which, for high frequency components, acts as a true integrator, i.e. the transfer function $F(s)$ of the circuitry tends to $1/s$ as $s$ tends to infinity, while rejecting low frequency components, i.e. $F(s)$ tends to zero as $s$ tends to zero.

---

This invention relates to track holding systems for aircraft and particularly to track holding systems for aircraft having auto-pilots.

According to the invention a track holding system comprises a receiver capable of receiving beam signals from a transmitter which defines a track, means capable of transmitting the signal received by the receiver to the aircraft's auto-pilot in the form of a beam error signal, and means capable of providing a further signal for transmitting to the auto-pilot, said further signal being such that the aircraft can be controlled to move towards the track at a rate which is a function of its displacement from the track and representing integral of bank angle of the aircraft.

Said further signal may be produced by an integrator unit which is arranged to derive its input from the vertical gyro of the aircraft.

Said further signal may be arranged to be washed out by a feed back arrangement associated with the integrator unit whereby said further signal is caused to correspond to track angle error.

Said further signal may also be passed through an additional washout unit such that long term errors present in the signal from the vertical gyro are substantially eliminated.

The additional washout unit may be connected in the system so as to derive its input from the integrator unit.

A signal derived from the beam error signal may be fed to the integrator unit and the additional washout unit in such a manner as to compensate for the washing out of said further signal.

The foregoing and further features of the invention will become evident from the following description of two preferred embodiments thereof with reference to the accompanying drawings, in which.

Figure 1:
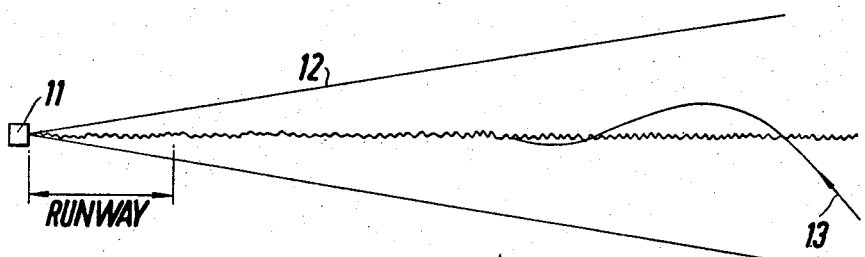
FIGURE 1 is a plan view showing a possible approach path for an aircraft using a beam emitted from a localiser transmitter.

Referring firstly to FIGURE 1 a localiser transmitter 11 at the far end of the runway emits a beam 12 which gives an indication of the angular displacement of an approaching aircraft 13 at any particular instant of time from a centre line, the latter coinciding with the centre line of the runway.

The system includes the normal aircraft stabilising loop arrangement consisting of a vertical gyro 20 and a rate gyro 21 providing signals 22 and 23 respectively which are fed to an auto-pilot actuator 24 controlling ailerons 25.

A beam error signal $y$ is provided by an arrangement consisting of a beam receiver 26 which feeds a beam error signal $y$ at 27 into a command modifier 28. The command modifier 28 produces a control signal 29 which is fed through a bank demand limiter 30 to the auto-pilot actuator 24 and thus to the ailerons 25.

Stabilisation of the track holding arrangement to prevent hunting is derived from the vertical gyro 20 which feeds a signal bank angle signal $\phi_g$ at 31 into an integrator 32 which produces an integrated signal 33 which is fed into the command modifier 28. This signal acts to turn the aircraft along the track as it approaches the track and thus prevent or reduce overshoot, in an approximately asymptotic manner.

In order to allow this stabilisation signal 33 to correspond to track angle error the signal 33 is washed out by a feedback arrangement 34.

A further control signal 35 is also provided derived from the receiver 26 through an integrator 36. Since the signal $y$ at 27 may have an offset component due to null error drift in signals developed by the circuitry of the system, the integrator 36 is provided to null any such system-originating electrical offset.

Figure 3:
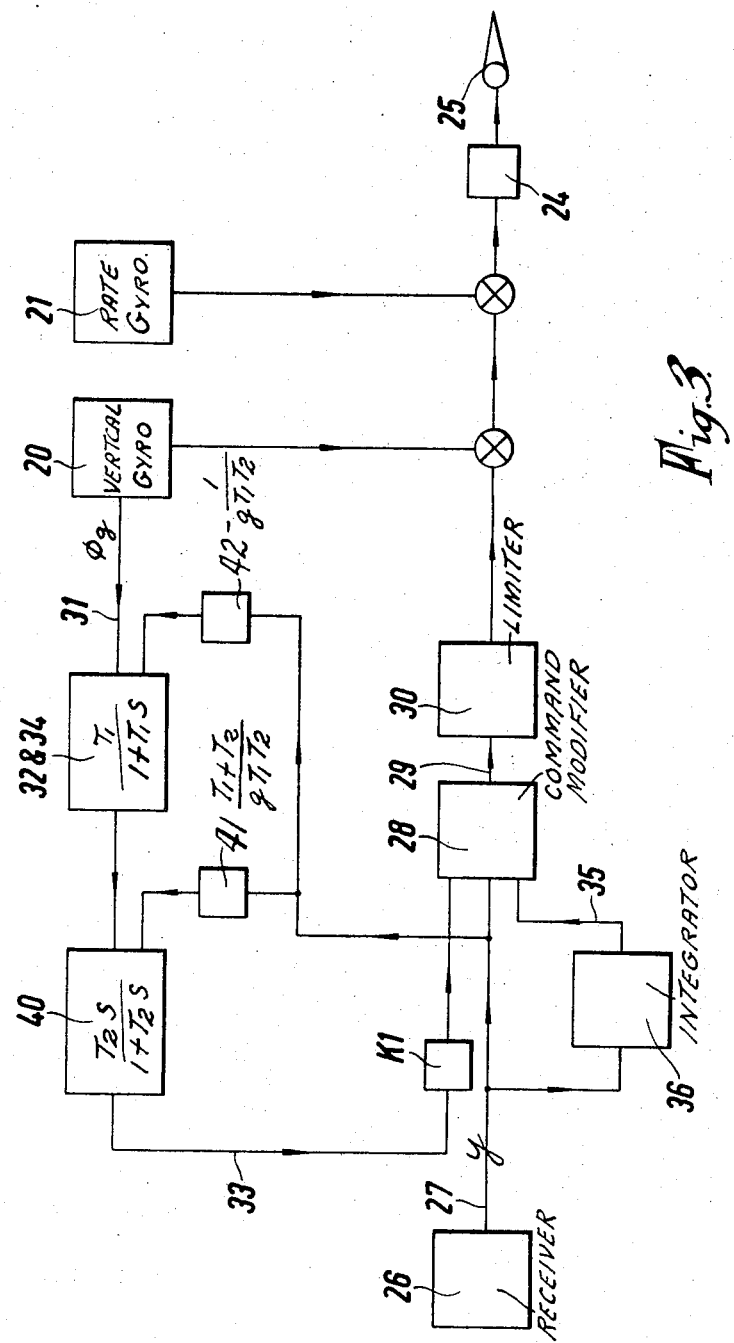
FIGURE 3 is a block diagram showing the general arrangement of another embodiment of the system.

Referring now to FIGURE 3 there is shown a track holding system according to a further embodiment of the invention.

Figure 2:
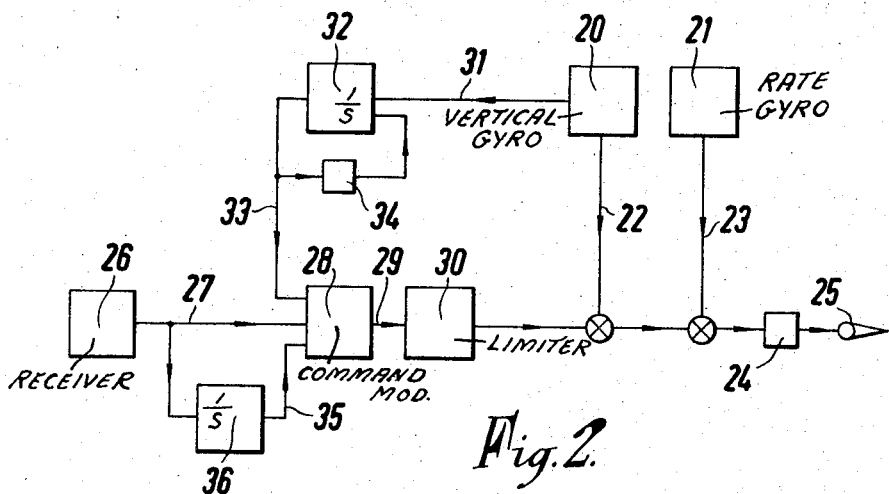
FIGURE 2 is a block diagram showing the general arrangement of one embodiment of the system.

This track holding system is a modification of the system shown in FIGURE 2 and includes a further washout unit 40 connected between the integrator 32 and the command modifier 28. This further washout unit 40 is arranged to be such that long term errors present in the output from the integrator 32 are substantially eliminated.

The output from the further washout unit 40 is fed via a gain K1 to the command modifier 28.

The beam error signal $y$ at 27 is fed via respective amplifiers 41 and 42 to the integrator and washout units 32 and 34 and to the further washout unit 40. By properly choosing the gains of the amplifiers 41 and 42, the signal at 33 can be made substantially equal to the integral of bank angle $\phi$.

The following is a theoretical explanation of the operation of the track holding system shown in FIGURE 3. With zero side slip lateral acceleration is produced by the component of the lift vector in the horizontal plane perpendicular to the roll axis.

$$\therefore \ddot{y} = g\int (\phi - \phi_e)dt + c$$

where:
$\ddot{y}=ys$, $y$ being lateral displacement from beam center line
$s=$Laplace operator
$\phi=$actual bank angle in radians
$\phi_e=$difference between the actual bank angle $\phi$ and the bank angle indicated by the vertical gyro
$c=$initial lateral displacement rate Since the initial condition $c$ is unknown it is eliminated by operating on it with $$\frac{Ts}{1+Ts}$$

$$\dot{y}\frac{Ts}{1+Ts} = g\frac{(\phi-\phi_e)}{s}\frac{Ts}{1+Ts} + c\frac{Ts}{1+Ts}$$

$$= g\phi\frac{T}{1+Ts} - Tg\phi_e$$

at $t=\infty$
If $\phi_e$ is significant a further operation is required.

$$\ddot{y} \frac{T_1 T_2 s^2}{(1+T_1 s)(1+T_2 s)} = g\phi \frac{T_1 T_2 s}{(1+T_1 s)(1+T_2 s)}$$

From the above, it will be apparent that if the bank angle output $\phi_g$ of the vertical gyro ($\phi - \phi_g = \phi_e$) is operated upon by the two simple transfer functions $$\frac{T_1}{1+T_1 s} \text{ and } \frac{T_2 s}{1+T_2 s}$$

this is equivalent to doubly washed out displacement rate $\dot{y}$. When the response of the system is more rapid than the washout time constants $T_1$ and $T_2$, the system is satisfactory for short term stability. The output at 33 would then be of the form $$\phi_g \left(\frac{T_1}{1+T_1 s}\right)\left(\frac{T_2 s}{1+T_2 s}\right)$$

The effect of this is that for high frequency components, the transfer function $F(s)$ of the circuitry producing the output 33 acts as a true integrator, i.e. $F(s)$ tends to $1/s$ as $s$ tends to infinity, while rejecting low frequency components, i.e. $F(s)$ tends to zero as $s$ tends to zero.

However, it is preferred to have the output 33 substantially equal to the integral of the bank angle, i.e. substantially equal to $\phi/s$. Since the output 33, as above, is $$\phi_g \left(\frac{T_1}{1+T_1 s}\right)\left(\frac{T_2 s}{1+T_2 s}\right)$$

it is evident that the additional function $$\frac{1}{s} - \left(\frac{T_1}{1+T_1 s}\right)\left(\frac{T_2 s}{1+T_2 s}\right)$$

must be used to produce an output at 33 which is substantially equal to $\phi/s$. Considering this additional function, we have $$\frac{1}{s} - \frac{T_1 T_2 s}{(1+T_1 s)(1+T_2 s)}$$

$$= \frac{1+(T_1+T_2)s+T_1 T_2 s^2 - T_1 T_2 s^2}{s(1+T_1 s)(1+T_2 s)}$$

$$= \frac{1+(T_1+T_2)s}{s(1+T_1 s)(1+T_2 s)}$$

$$= \frac{1}{s^2}\left[\frac{s+(T_1+T_2)s^2}{(1+T_1 s)(1+T_2 s)}\right] = \frac{1}{s^2}\left[\frac{s(T_1+T_2)(1+T_1 s) - T_2 s}{T_1(1+T_1 s)(1+T_2 s)}\right]$$

$$= \frac{1}{s^2}\left[\frac{s(T_1+T_2)}{T_1(1+T_2 s)} - \frac{T_2 s}{T_1(1+T_1 s)(1+T_2 s)}\right]$$

However $$\frac{\phi}{s^2} = \frac{y}{g}$$

∴ required additional function =

$$\frac{T_1+T_2}{gT_1 T_2}\left[\frac{T_2 s}{1+T_2 s}\right]y - \frac{1}{gT_1 T_2}\left[\frac{T_1 T_2 s}{(1+T_1 s)(1+T_2 s)}\right]y$$

From the foregoing, it will be apparent that if the gain of the amplifier 41 is equal to $$\frac{T_1+T_2}{gT_1 T_2}$$

and the gain of the amplifier 42 is equal to $$-\frac{1}{gT_1 T_2}$$

the required additional functions are present so that the output signal at 33 is substantially equal to $\phi/s$.

If $T_1 = T_2 = T$ the above equation may be written $$\frac{2}{gT}\left[\frac{Ts}{1+Ts}\right]y - \frac{1}{gT^2}\left[\frac{T^2 s}{(1+Ts)^2}\right]y$$

I claim:

1. In a track holding system for an aircraft, in combination,
receiver means responsive to track-defining beam signals and having an output representing lateral displacement of the aircraft from the center line of the track beam,
control means for banking the aircraft to approach said center line in response to the output of said receiver means,
aircraft attitude reference means having an output indicative of aircraft bank angle,
and circuit means connecting the output of said reference means to said control means, said circuit means including lag means followed by washout means whereby the circuit means has a transfer function $F(s)$ which, for high frequency components, acts like a true integrator i.e. the transfer function tends to $1/s$ as $s$ tends to infinity, while rejecting low frequency components, i.e. $F(s)$ tends to zero as $s$ tends to zero, $s$ being the Laplace operator.

2. In the track holding system as defined in claim 1 wherein said transfer function is of the form $$\frac{Ks}{(1+T_1 s)(1+T_2 s)}$$

when K is a constant, $s$ is the Laplace operator, and $T_1$ and $T_2$ are time constants.

3. In the track holding system as defined in claim 1 wherein said lag means has a transfer function of the form $$\frac{T_1}{1+T_1 s}$$

and said washout means has a transfer function of the form $$\frac{T_2 s}{1+T_2 s}$$

when $T_1$ and $T_2$ are time constants and $s$ is the Laplace operator,
first amplifier means connecting the output of said receiver means to said washout means, said first amplifier means having a gain $$\frac{T_1+T_2}{gT_1 T_2}$$

when $g$ is the acceleration due to gravity,
and second amplifier means connecting the output of said receiver means to said lag means, said second amplifier means having a gain $$-\frac{1}{gT_1 T_2}$$

4. A track holding system for an aircraft provided with an autopilot, which comprises: receiver means responsive to received track-defining beam signals, so as to develop a beam error signal representing lateral displacement of the aircraft from the center line of the track and constituting the stiffness term for track holding control; aircraft attitude reference means operative to develop a signal indicative of aircraft bank angle $\phi$; circuitry which has input terminal means to which the bank angle signal is applied a transfer function such that, for high frequency components, the circuitry behaves substantially as a true integrator i.e., the transfer function $F(s)$ tends to $1/s$ as $s$ tends to infinity, while rejecting low frequency components, i.e., $F(s)$ tends to zero as $s$ tends to zero, and output terminal means at which a signal constituting the damping term for the track holding control is produced.

5. A system according to claim 4 in which the circuitry has, between the said input and output terminal means, a transfer function of the form $$\frac{Ks}{(1+T_1 s)(1+T_2 s)}$$

6. A system according to claim 4 in which the circuitry includes lag circuit means having input terminal means, constituting the said input terminal means of the circuitry, followed by washout circuit means, having output terminal means constituting the said output terminal means of the circuitry.

7. A system according to claim 6 in which the lag circuit means is a first order lag and the washout circuit means is a first order washout.

8. A system according to claim 6 in which the circuitry has further input terminal means to which a signal from the receiver output is applied; and, between the further input terminal means and the output terminal means, the circuitry has a transfer function such that for low frequency signal components the circuitry behaves as a washout.

9. A system according to claim 8 in which the circuitry comprises signal amplifier means connected between the further input terminal means and the junction between the lag circuit means and the washout circuit means.

10. A system according to claim 9 in which the circuitry comprises further signal amplifier means connected between the further input terminal means and the first mentioned input terminal means.

11. An aircraft including an autopilot and a track holding system which comprises: receiver means responsive to received track-defining beam signals, so as to develop a beam error signal representing lateral displacement of the aircraft from the center line of the track and constituting the stiffness term for track holding control; aircraft attitude reference means operative to develop a signal indicative of aircraft bank angle $\phi$; circuitry which has input terminal means to which the bank angle signal is applied, a transfer function such that, for high frequency components, the circuitry behaves substantially as a true integrator i.e., the transfer function $F(s)$ tends to $1/s$ as $s$ tends to infinity, while rejecting low frequency components, i.e., $F(s)$ tends to zero as $s$ tends to zero, and output terminal means at which a signal constituting the damping term for the track holding control is produced; and a command modifier operative in response to the beam error signal and the damping signal to develop a track holding control signal for the aircraft autopilot.

12. An aircraft according to claim 11 in which the circuitry has, between the said input and output terminal means, a transfer function of the form $$\frac{Ks}{(1+T_1 s)(1+T_2 s)}$$

13. An aircraft according to claim 11 in which the circuitry includes lag circuit means having input terminal means, constituting the said input terminal means of the circuitry, followed by washout circuit means, having output terminal means constituting the said output terminal means of the circuitry.

14. An aircraft according to claim 13 in which the lag circuit means is a first order lag and the washout circuit means is a first order washout.

15. An aircraft according to claim 13 in which the circuitry has further input terminal means to which a signal from the receiver output is applied; and, between the further input terminal means and the output terminal means, the circuitry has a transfer function such that for low frequency signal components the circuitry behaves as a washout.

16. An aircraft according to claim 15 in which the circuitry comprises signal amplifier means connected between the further input terminal means and the junction between the lag circuit means and the washout circuit means.

17. An aircraft according to claim 16 in which the circuitry comprises further signal amplifier means connected between the further input terminal means and the first mentioned input terminal means.

References Cited
UNITED STATES PATENTS

| | | | |
|---|---|---|---|
| 2,775,421 | 12/1956 | Markusen | 244—77 |
| 3,038,156 | 6/1962 | Osder | 343—107 |
| 3,223,362 | 12/1965 | Doniger | 244—77 |

MILTON BUCHLER, *Primary Examiner.*

B. BELKIN, *Assisant Examiner.*